United States Patent [19]

Hayami et al.

[11] Patent Number: 4,777,452

[45] Date of Patent: Oct. 11, 1988

[54] BIT CLOCK SIGNAL GENERATOR FOR USE IN A DIGITAL SIGNAL DEMODULATOR

[75] Inventors: Atsushi Hayami; Tsuyoshi Ono, both of Yamato; Kazuo Hikawa, Mitaka; Takeshi Shimizu, Yokohama, all of Japan

[73] Assignee: Victor Company of Japan Ltd., Yokohama, Japan

[21] Appl. No.: 102,997

[22] Filed: Sep. 30, 1987

[30] Foreign Application Priority Data

Oct. 1, 1986 [JP] Japan ............... 61-231313

[51] Int. Cl.[4] .................. H04B 1/16
[52] U.S. Cl. ................... 331/25; 329/122; 358/188; 455/266
[58] Field of Search ............. 331/18, 20, 23, 25; 329/122; 358/137, 188, 335; 455/208, 256, 265, 266; 375/120

[56] References Cited

U.S. PATENT DOCUMENTS 4,617,526 10/1986 Hikawa et al. ............ 331/1 A
4,628,282 12/1986 Hikawa et al. ............ 331/1 A
4,672,329 6/1987 Hikawa ..................... 331/1 A Primary Examiner—Eugene R. LaRoche
Assistant Examiner—Robert J. Pascal
Attorney, Agent, or Firm—Holman & Stern

[57] ABSTRACT

This invention relates to a digital audio tape recorder using a rotary magnetic head. On the tape which has been recorded using R-DAT, signals forming to the industry standards are recorded at a standard tape speed. The tape is caused to run at a speed faster than the standard tape speed and the recording signal is subjected to high speed reproducing while maintaining the rotational frequency of the head at a rotational speed at the time of recording. For realizing this, a bit clock signal generator for use in a digital signal demodulator is provided, which comprises means for generating a detection window pulse having a predetermined pulse width shorter than a period of a bit clock signal from either of time points of rise and fall of the waveform of a signal to be demodulated, or from both the time points thereof, said signal to be demodulated being a digital signal modulated in accordance with a modulation system such as a system constituted with a periodical signal intermittently including a phase information of the bit clock signal to deliver the detection window pulse to a phase locked loop including a phase comparison circuit and a voltage controlled oscillator as a comparison wave, thus allowing the voltage controlled oscillator in the phase locked loop to generate a bit clock signal, characterized by the provision of means for changing the pulse width of the detection window pulse in correspondence with changes in a bit rate of the demodulated signal.

5 Claims, 5 Drawing Sheets

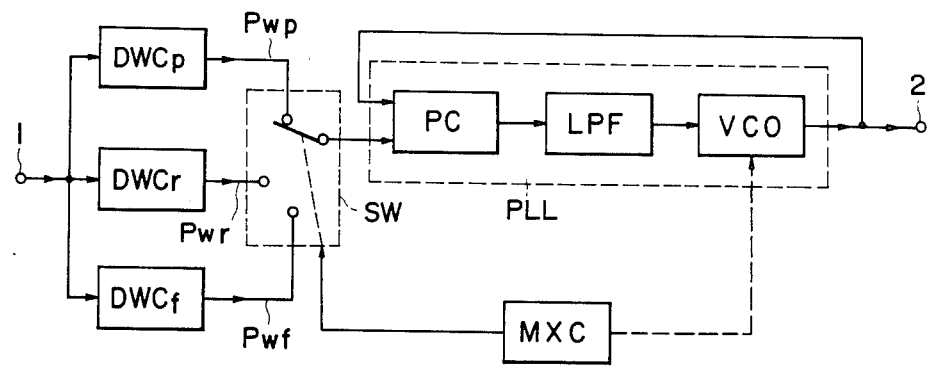
F I G. 1
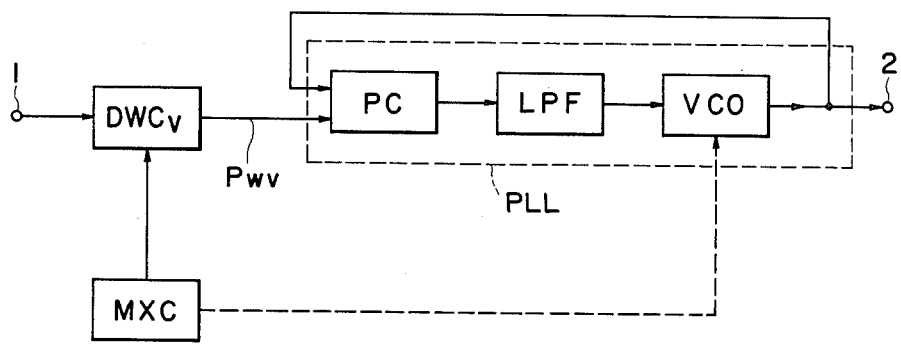
F I G. 2
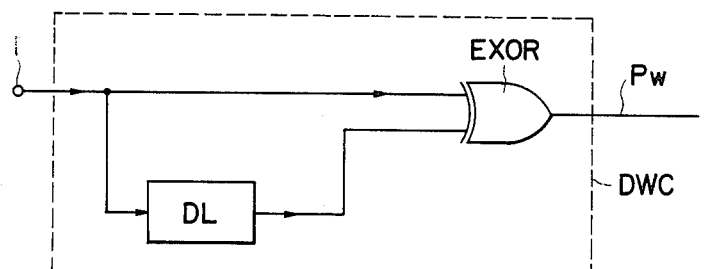
F I G. 3

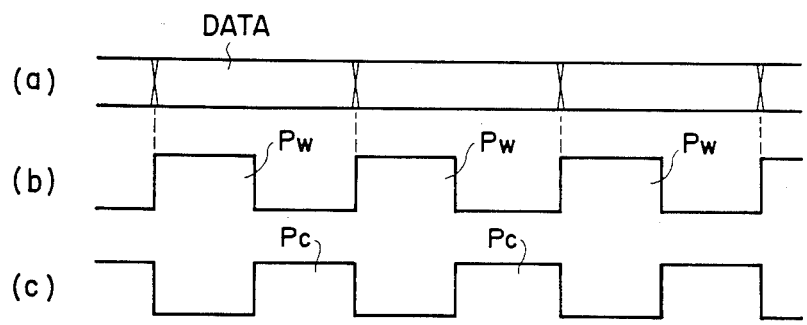
F I G. 7
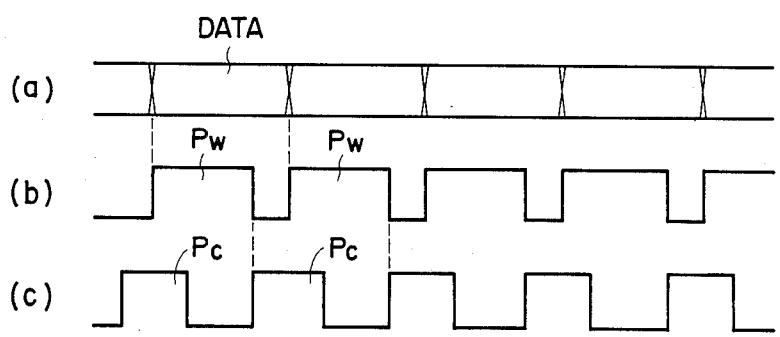
F I G. 8
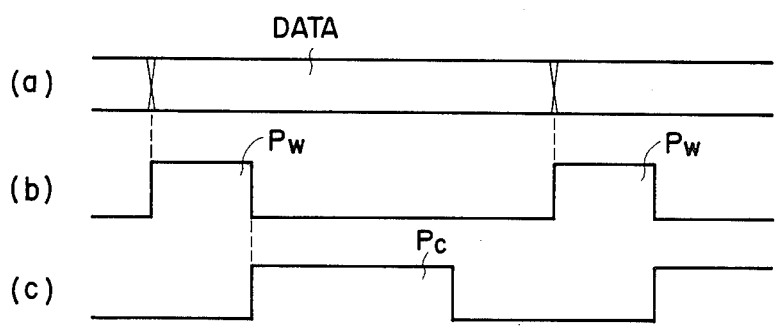
F I G. 9

BIT CLOCK SIGNAL GENERATOR FOR USE IN A DIGITAL SIGNAL DEMODULATOR

BACKGROUND OF THE INVENTION

The present invention relates to a bit clock signal generator for use in a digital signal demodulator, which comprises means for generating a detection window pulse having a predetermined pulse width shorter than a period of a bit clock signal from either of time points of rise and fall of the waveform of a signal to be demodulated, or from both the time points thereof, the signal to be demodulated being a digital signal modulated in accordance with a modulation system such as a system constituted with a periodical signal intermittently including a phase information of a bit clock signal to deliver the detection window pulse to a phase locked loop including a pphase comparison circuit and a voltage controlled oscillator as a comparison wave, thus allowing the voltage controlled oscillator to generate a bit clock signal.

Namely, the present invention relates to a digital audio tape recording system known as the R-DAT, abbreviated after a rotary head digital audio tape system. On the tape which has been recorded using such R-DAT, signals conforming to the R-DAT industry standards are recorded. Such recording signals are recorded at a standard tape speed prescribed by the industry standards.

It is well known that in recording and transmitting a digital signal, the digital signal subject to the recording and transmission is to be recorded and transmitted with the digital signal being modulated by a particular modulation system selected from various modulation systems. In demodulating a signal subject to demodulation, i.e., a signal to be demodulated which has been modulated in accordance with a particular modulation system as mentioned above, a bit clock signal is required. In dependence upon the kind of a modulation system employed, there are instances where phase information of a bit clock is only intermittently included in a signal subject to demodulation.

In general, such a bit clock signal necessary at the time of demodulation is derived from a signal to be demodulated. However, for a digital signal constituted with a periodical signal which includes intermittently phase information of the bit clock signal, merely employment of a phase locked loop of the ordinary construction fails to derive a bit clock signal. This is readily understood in light of the fact that phase information of a bit clock signal only intermittently exists in a signal to be modulated.

For a bit clock signal generator capable of generating a bit clock signal necessary at the time of demodulation derived from a signal to be demodulated of a digital signal constituted with a periodical signal which contains intermittently phase information of a bit clock signal, signal generators of various configurations have been conventionally proposed. The applicant company have also proposed bit clock signal generator for use in digital signal demodulator as disclosed in, e.g., U.S. Pat. No. 4,628,282 issued to the present applicant and U.S. Pat. No. 4,617,526 (Victor) etc. for a bit clock signal generator for use in a digital signal demodulator comprising means for generating a detection window pulse having a predetermined pulse width shorter than a period of a bit clock signal from either of time points of rise and fall of the waveform of a signal to be demodulated, or from the both time points thereof, the signal to be demodulated being a digital signal modulated in accordance with a modulation system such as a system constituted with a periodical signal intermittently including a phase information of the bit clock signal to deliver the detection window pulse to a phase locked loop including a phase comparison circuit and a voltage controlled oscillator, as a comparison wave, thus allowing the voltage controlled oscillator in the phase locked loop to generate a bit clock signal. Moreover, in the case of a signal such that a signal subject to demodulation is intermittent on the time axis with having a relatively long period during which no signal exists, i.e., "relatively long no signal period", e.g., in the case of a signal having a long no signal period, such as a signal obtained by recording and reproducing a digital signal having been modulated in accordance with a modulation system such as a system constituted with a periodical signal intermittently including phase information of a bit clock signal on a magnetic tape wound around the rotary cylinder at a winding angle of 90 degrees by using two magnetic heads provided at positions which have symmetry of 180 degrees (positions where an angular distance is 180 degrees) around the rotary cylinder in a rotary head type magnetic recording and reproducing equipment, the problem with the previously proposed bit clock signal generator for use in a digital signal demodulator is that when the phase locked loop is unlocked during a long no signal period, it takes long time until the phase locked loop recovers into a locked condition by a signal which appears again after the no signal period has elapsed, whereby a demodulated signal is disturbed. The applicant of this invention has proposed a digital signal demodulator provided with a bit clock signal generator which has solved such a problem in U.S. Pat. No. 4,672,329 (Victor). In a digital signal demodulator provided with a bit clock signal generator and a digital signal demodulator provided with the abovementioned bit clock signal generator, the first-mentioned bit clock signal generator comprising: means for generating a detection window pulse having a predetermined pulse width shorter than a period of a bit clock signal from either of time points of rise and fall of the waveform of a signal subject to demodulation, or from both the time points thereof, the signal subject to demodulation being a digital signal having been modulated in accordance with a modulation system such as a system constituted with a periodical signal intermittently including a phase information of the bit clock signal; means for delivering, as a comparison wave, the detection window pulse to a phase locked loop including a phase comparison circuit and a voltage controlled oscillator; a first pulse source for generating a first pulse having a period T1; a second pulse source for generating a second pulse having a period T2 which has the relationship of T2<T1 with respect to the period T1 of the first pulse generated in the first pulse source; first measurement means for measuring the period T1 of the first pulse generated in the first pulse source with a bit clock signal obtained from the voltage controlled oscillator in the phase locked loop being as a reference pulse for measurement, second measurement means for measuring the period T2 of the second pulse generated in the second pulse source with a bit clock signal obtained from the voltage controlled oscillator in the phase locked loop being as a reference pulse for measurement; means for producing a first signal when a measured value N1 defined as a value obtained by counting the period T1 of the first pulse having been generated in the first pulse source using the reference pulse is less than a minimum value N1s determined in correspondence with a first allowed variable range of an oscillating frequency in the voltage controlled oscillator, and for producing a second signal when the measured value N1 is larger than a maximum value N1l determined in correspondence with the first allowed variable range of the oscillating frequency; means for producing a third signal when a measured value N2 defined as a value obtained by counting the period T2 of the second pulse having been generated in the second pulse source using the reference pulse is less than a minimum value N2s determined in correspondence with a second allowed variable range of an oscillating frequency set so as to have a frequency change rate larger than a frequency change rate in the first allowed variable range set for the oscillating frequency of the voltage controlled oscillator, and for producing a fourth signal when the measured value N2 is larger than a maximum value N2l determined in correspondence with the second allowed variable range of the oscillating frequency in the voltage controlled oscillator; means for obtaining a first error signal using the first and third signals; means for obtaining a second error signal using the second and fourth signals; and means for controlling an error signal of the phase comparison circuit in the phase locked loop using the respective error signals, this signal demodulator provided with the bit clock signal generator is characterized in that it comprises means for selectively allowing either of the first and second signals or both the signals to be invalid. In addition, the applicant of this invention has also proposed in Japanese patent application No. 30119/1986 a digital signal recording and reproducing equipment capable of controlling a running speed of the magnetic tape for permitting retrieval of an ETM (eight-to-ten modulation) signal from the magnetic tape with the magnetic tape being caused to run at a speed larger than a speed at the time of recording in the above-mentioned rotary magnetic head type magnetic recording/reproducing equipment.

As previously mentioned, a bit rate of a signal subject to demodulation obtained by running a magnetic tape from which a digital signal having been modulated in accordance with a modulation system such as a system constituted with a periodical signal intermittently including phase information of a bit clock signal is reproduced at a tape speed different from that at the time of recording, by using two rotary magnetic heads rotating at the same rotational speed as that at the time of recording will be different from a bit rate of a signal subject to demodulation at the time of an ordinary reproducing mode to reproduce a digital signal by using two rotary magnetic heads rotating at the same rotational as that at the time of recording from the magnetic tape caused to run at the same running speed as that at the time of recording.

Also as previously described, a bit clock signal is required for demodulating a signal subject to demodulation. However, with the conventional bit clock signal generator to generate a detection window pulse having a predetermined pulse width shorter than a period of a bit clock signal from either of time points of rise and fall of the waveform of a signal subject to demodulation, or from both the time points thereof for generating a bit clock signal necessary at the time of demodulation from the signal subject to demodulation of a digital signal constituted with a periodical signal only intermittently including a phase information of the bit clock signal to deliver the detection window pulse to a phase locked loop including a phase comparison circuit and a voltage controlled oscillator as a signal wave to be compared with, thus generating a bit clock signal from the voltage controlled oscillator in the phase locked loop, there occurs a problem that since the pulse width of the detection window pulse to be phase-compared with the bit clock signal outputted from the voltage controlled oscillator in the phase comparison circuit of the phase locked loop, is fixed even when the bit rate of the signal subject to demodulation varies, difficulty in making a normal phase comparison, prolonged lock-in time, lowered detection margin and the like would occur when the bit rate of the signal subject to demodulation changes.

The above-mentioned problem will be explained with reference to the attached drawings. FIG. 6 shows a phase comparison circuit PC as shown in FIG. 3 in U.S. Pat. No. 4,628,282. The circuit arrangement shown in FIG. 6 includes an input terminal 3 for a bit clock signal Pc, an input terminal 4 for a detection window pulse Pw, Dtype flip-flops 5 and 6, inverters 7 and 8, and resistors 9 to 12.

A phase error signal outputted from the phase comparison circuit PC shown in FIG. 6 is delivered to a voltage controlled oscillator via a low-pass filter. A signal outputted from the voltage controlled oscillator is used as a bit clock signal Pc and is also delivered to the terminal 3 of the phase comparison circuit PC.

In FIGS. 7 to 9, the waveform of each item (a) denotes a signal subject to demodulation (labeled DATA), that of each item (b) a detection window pulse Pw, and that of each item (c) a bit clock signal Pc. FIG. 7 shows that the signal subject to demodulation has a normal bit rate, FIG. 8 shows that it has a bit rate higher than the normal bit rate, and FIG. 9 shows that it has a bit rate lower than the normal bit rate.

An attention is now drawn to the case where the pulse width of the detection window pulse Pw is fixed even when the bit rate of a signal subject to demodulation changes, as shown in FIGS. 7 to 9. Under this circumstance, when the bit rate of the signal subject to demodulation is higher than the ordinary bit rate as shown in FIG. 8, the pulse width of the detection pulse Pw becomes too broad as compared to the pulse width of the bit clock signal Pc, resulting in failure in the normal phase comparison. In contrast, when the bit rate of the signal subject to demodulation is lower than the ordinary bit rate as shown in FIG. 9, the pulse width of the detection pulse Pw becomes too narrow as compared to the pulse width of the bit clock signal Pc, with the result that the pulse width of the phase error signal becomes narrow, the lock-in time is prolonged, and the detection margin for demodulation is lowered.

In the case of a reproduced signal from a magnetic recording/reproducing equipment adapted to effect a speed control of the magnetic tape while reading data at the time of the fast forward rewind operation, an increase of jitter of a signal subject to demodulation occurs due to the fact that the load to the tape transport system becomes heavy at the time of the rewinding-/fast-feeding operation, and changes of the load of the running tape with respect to the head cylinder due to speed unevenness produce jitter in the rotation of the head cylinder, with the result that the jitter of the signal subject to demodulation is increased, thus leading to lowering of the detection margin.

SUMMARY OF THE INVENTION

An object of the present invention is to provide a bit clock signal generator for use in a digital signal demodulator for permitting the pulse width of a detection window pulse to be changeable so that it is broad or narrow, thus allowing it to be in conformity with the pulse width of a bit clock signal, thereby to ensure a precise phase comparison, thus to satisfactorily demodulate a digital signal, and more particularly to realize a high tape speed reproducing operation with the rotational frequency of the head being kept at a value at the time of recording.

To achieve the above-mentioned object, the present invention provides a bit clock signal generator for use in a digital signal demodulator comprising means for generating a detection window pulse having a predetermined pulse width shorter than a period of a bit clock signal from either of time points of rise and fall of the waveform of a signal subject to demodulation, or from both the time points thereof, the signal subject to demodulation being a digital signal modulated in accordance with a modulation system such as a system constituted with a periodical signal intermittently including a phase information of the bit clock signal to deliver the detection window pulse to a phase locked loop including a phase comparison circuit and a voltage controlled oscillator as a signal wave to be compared with, thus allowing the voltage controlled oscillator in the phase locked loop to generate a bit clock signal, characterized by the provision of means for changing the pulse width of the detection window pulse in correspondence with changes in a bit rate of the signal subject to demodulation.

BRIEF DESCRIPTION OF THE DRAWINGS

In the accompanying drawings:

FIGS. 1 and 2 are block diagrams illustrating different embodiments of a bit clock signal generator for use in a digital signal demodulator according to the present invention, respectively;

FIG. 3 is a block diagram illustrating an example of a detection window pulse generating circuit in the bit clock signal generator for use in the digital signal demodulator shown in FIG. 1;

FIGS. 7 to 9 show waveforms for explanation of the problems with conventional equipment.

PREFERRED EMBODIMENTS OF THE INVENTION

The actual contents of a bit clock signal generator for a digital signal demodulator according to the present invention will be explained in detail by making reference to the attached drawings.

Figure 4A:
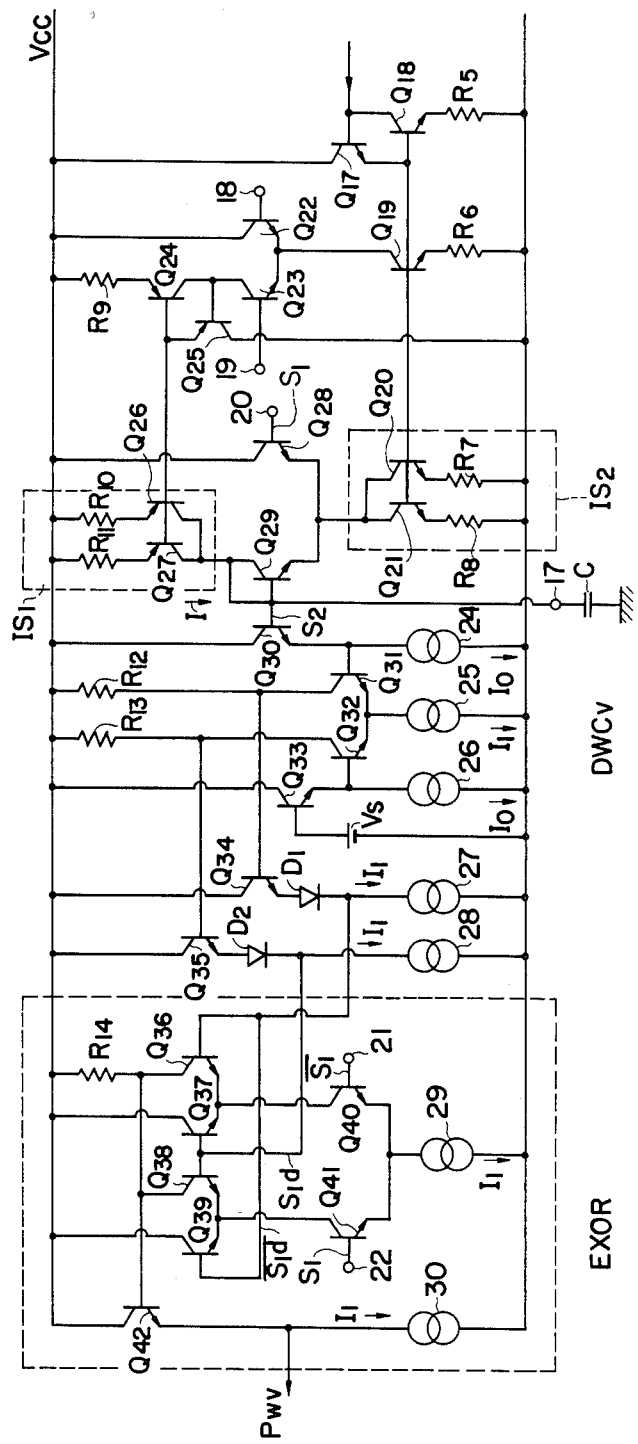
FIGS. 4(a), (b) are a schematic diagram illustrating an example of a detection window pulse generating circuit suitable for use in the bit clock signal generator for the digital signal demodulator shown in FIG. 2.
Figure 4B:
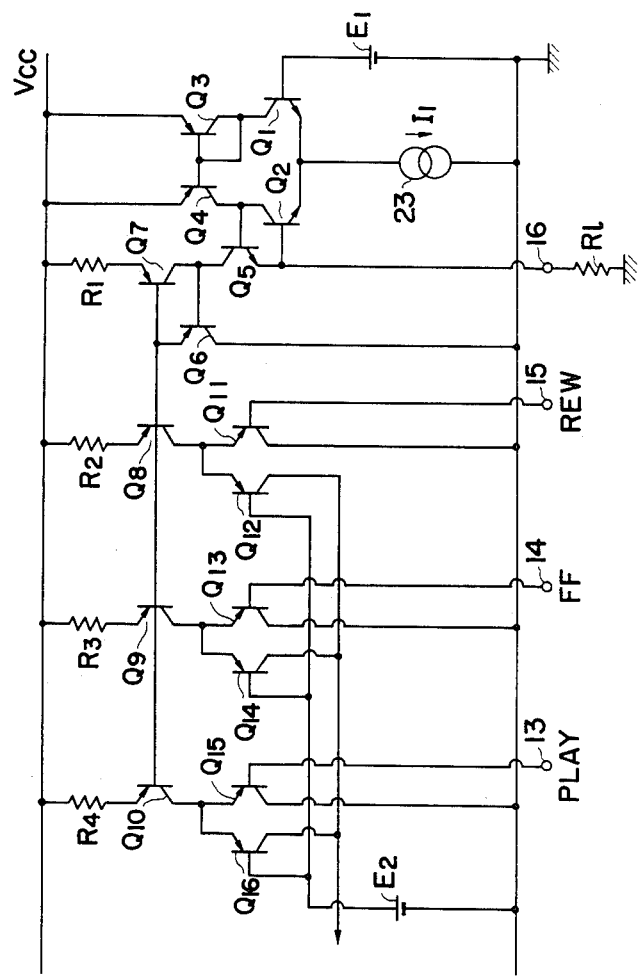
Figure 5:
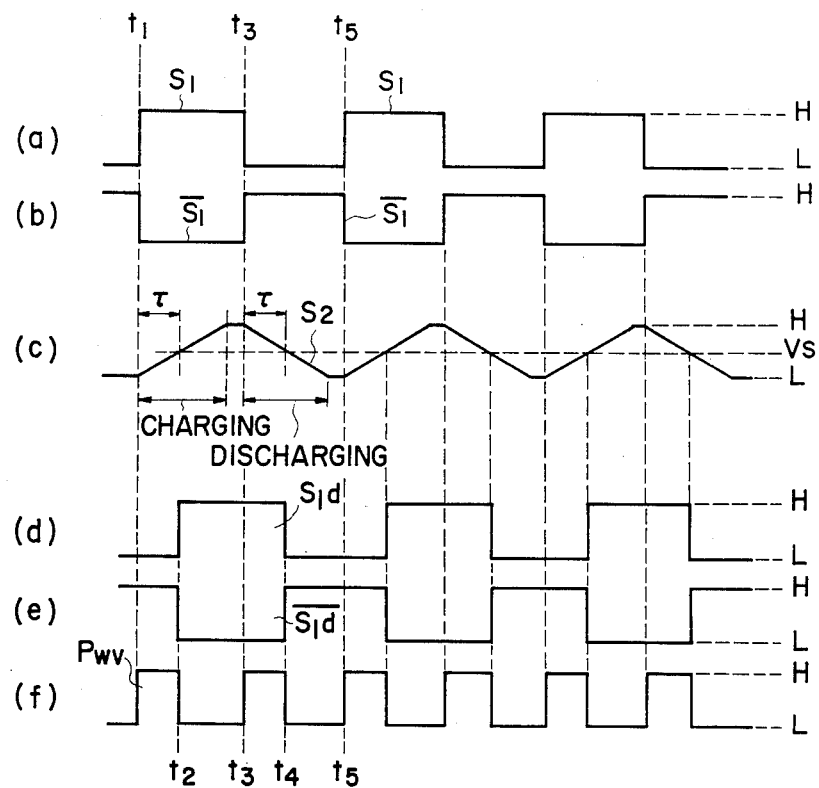
FIG. 5 shows waveforms for explanation of the operation of the detection window pulse generating circuit shown in FIG. 4.
Figure 6:
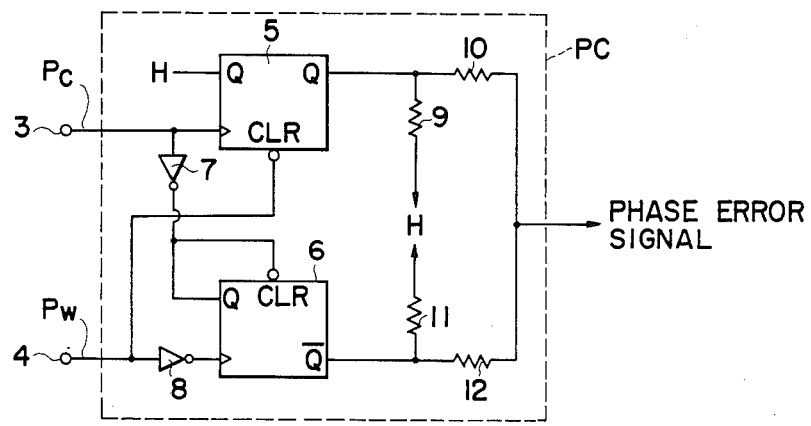
FIG. 6 is a block diagram illustrating an example of a phase comprison circuit PC.

FIGS. 1 and 2 are block diagrams illustrating different embodiments of a bit clock signal generator for use in a digital signal demodulator according to the present invention, respectively. FIG. 3 is a block diagram illustrating an example of a detection window pulse generating circuit in the bit clock signal generator for use in the digital signal demodulator shown in FIG. 1. FIGS. 4(a), (b) are a schematic diagram illustrating an example of a detection window pulse generating circuit suitable for use in the bit clock signal generator for the digital signal demodulator shown in FIG. 2. FIG. 5 shows waveforms for explanation of the operation of the detection window pulse generating circuit shown in FIG. 4.

The bit clock signal generators for use in a digital signal demodulator of the invention shown in FIGS. 1 and 2 correspond to embodiments in which the present invention is impremented to a bit clock signal generator in the so-called R-DAT described before. Each of circuit arrangements shown in FIGS. 1 and 2 includes an input terminal 1 for an ETM (eight-to-ten modulation) signal as a signal to be demodulated of a digital signal having been demodulated in accordance with a modulation system such as a system constituted with a periodical signal intermittently including phase information of a bit clock signal (a signal such that an ETM signal as a signal to be demodulated is subjected to waveform shaping and the time points of rise and fall of the waveform in the signal subject to demodulation are well-defined), an output terminal 2 for the bit clock signal, a phase locked loop labeled PLL comprising a phase comparison circuit PC, a low-pass filter LPF and a voltage controlled oscillator VCO, and a reproducing mode switching circuit MXC. The circuit arrangement shown in FIG. 1 further includes a changeover switch SW and detection window pulse generating circuits DWCp, DWCr and DWCf. The circuit arrangement shown in FIG. 2 further includes a detection window pulse generating circuit DWCv.

In the bit clock signal generator for use in the digital signal demodulator of the invention shown in FIGS. 1 and 2, the arrangement of a portion for generating a bit clock signal is illustrated as an arrangement such as a simple phase locked loop for the brevity of illustration and explanation. Actually, by employing such as an arrangement capable of generating a bit clock signal necessary at the time of demodulation from a signal to be demodulated of a digital signal constituted with a periodical signal intermittently including phase information of the bit clock signal, e.g. the above-mentioned arrangement of the bit clock signal generator for use in a digital signal demodulator as disclosed in Japanese Patent Laid-Open Nos. 206339/1985, 200635/1985 or the like, or the arrangement of the bit clock signal generator used in the digital demodulator proposed in Japanese Patent Laid-Open No. 99900/1985, a bit clock signal necessary at the time of demodulation is caused to be generated from a signal to be demodulated of a digital signal constituted with a periodical signal intermittently including phase information of the bit clock signal.

In FIG. 1, the detection window pulse generating circuits DWCp, DWCr and DWCf have arrangement such that they can generate detection window pulses having different pulse widths, respectively. In the following explanation, the detection window pulse generating circuit DWCp is assumed to be comprised of such as a circuit capable of generating a detection window pulse Pwp such as, for example, having a pulse width suitable for use as a detection window pulse in a condition where the rotary head type magnetic recording/reproducing equipment is conducting reproducing operation in an ordinary reproduction mode. Moreover, the detection window pulse generating circuit DWCr is assumed to be comprised of such as a circuit capable of generating a detection window pulse Pwr such as, for example, having a pulse width suitable for use as a detection window pulse when the rotary head type magnetic recording/reproducing equipment is conducting the reproducing operation in a rewinding mode. Furthermore, the detection window pulse generating circuit DWCf is assumed to be comprised of such as a circuit capable of generating a detection window pulse Pwf such as, for example, having a pulse width suitable for use as a detection window pulse when the rotary head type magnetic recording/reproducing equipment is conducting the reproducing operation in a fast forward mode.

Each of the detection window pulse generating circuits DWCp, DWCr and DWCf may be composed of an exclusive logical sum circuit EXOR and a delay circuit DL as indicated within the frame DWC illustrated with dotted lines in FIG. 3. It is possible to generate detection window pulses Pw (Pwp, Pwr, Pwf) having required pulse widths different from each other which are to be respectively generated in the detection window pulse generating circuits DWCp, DWCr and DWDf by setting delay times of the delay circuits DL provided in the detection window pulse generating circuits DWCp, DWCr and DWCf to respective required values.

The bit rate of a reproduced signal at the time of the rewinding mode and at the time of the fast forward mode where the magnetic tape runs at a speed higher than that at the time of recording (and at the time of ordinary reproducing) is different from the bit rate of a reproduced signal at the time of the ordinary reproducing. In a rotary magnetic head type magnetic recording-/reproducing equipment configured as a digital signal recording/reproducing equipment in which the running speed of the magnetic tape is controlled so that retrieval of the ETM signal cna be conducted from the magnetic tape with the magnetic tape being caused to run at a speed higher than that at the time of recording (and at the time of the ordinary reproducing), it is possible to identify in advance the bit rate of a reproduced signal at the time of the rewinding mode, the bit rate of a reproduced signal at the time of the fast forward mode, and the like, or to determine them in advance. In addition, since the bit rate of a reproduced signal at the time of the rewinding mode, the bit rate of a reproduced signal at the time of the fast forward mode, and the like can be readily known on the basis of the result detected of a relative linear speed caused between the running magnetic tape and the rotating head, information of the operational mode of the rotary magnetic head type magnetic recording/reproducing equipment, the information of the result detected from the relative linear speed between the running magnetic tape and the rotary head, or the like is used, thereby making is possible to generate a detection window pulse having a predetermined pulse width from the detection window pulse generating circuit in accordance with a ratio of the bit rate of a reproduced signal in the oridnary reproducing mode to a bit rate of a reproduced signal reproduced from the magnetic tape.

For example, an attention is drawn to a rotary head type magnetic recording/reproducing equipment such that the tangential speed of the head is 3.133 m/sec., the running speed of the magnetic tape at the time of an ordinary reproducing is 8.15 mm/sec., and the tracking angle, a track inclination with respect to the longitude of the tape, is 6°22'59" (six degree twenty two minutes 59 seconds). In connection with this equipment, there has been conducted examination of a change rate of the bit rate of a reproduced signal when running, in forward and backward directions, the magnetic tape at a running speed 200 times larger than that of the magnetic tape at the time of the ordinary reproducing. The fact that the change rate is approximately equal to $1\pm0.52$ when the bit rate of a regenerative signal at the time of the ordinary reproducing is assumed to be equal to 1 has been obtained as a calculated result.

In case where the change rate of a bit rate of a reproduced signal at the time of the rewinding and fast forward modes with respect to the bit rate of a reproduced signal at the time of the ordinary reproducing has been equal to $1\pm0.52$ when it is assumed that the bit rate of a reproduced signal at the time of the ordinary reproducing is equal to 1 as in the abovementioned example, it is apparent that if the ratio of pulse widths of the detection window pulses Pwp, Pwr and Pwf to be generated in the respective detection window pulse generating circuits DWCp, DWCr and DWCf in the bit clock signal generator for digital signal generator shown in FIG. 1 is changed to, e.g., 1:1/0.52:1/0.48, the phase comparing operation of the phase comparison circuit PC in the phase locked loop provided for generating a bit clock signal can be always satisfactory in any reproducing mode.

In the bit clock signal generator for digital signal demodulator shown in FIG. 1, detection window pulses generated in the detection window pulse generating circuits DWCp, DWCr and DWCf generating detection window pulses having pulse widths different from each other are switched by the changeover switch SW which performs switching action by a switching control signal delivered from the reproducing mode switching circuit MXC and one of the pulses obtained by switching is then delivered to the phase comparison circuit PC in the phase locked loop PLL as a comparison wave.

Dotted lines drawn from the reproducing mode switching circuit MXC to the voltage controlled oscillator in the phase locked loop PLL indicate that there may be employed an implementation such that the oscillating frequency of the voltage controlled oscillator VCO in the phase locked loop PLL is adjustable by a switching control signal sent from the reproducing mode switching circuit MXC (dotted lines drawn from the reproducing mode switching circuit MXC to the voltage controlled oscillator in the phase locked loop PLL in the embodiment shown in FIG. 2 indicate the same meaning as that shown in FIG. 1).

Now, in the bit clock signal generator for digital signal demodulator according to the present invention shown in FIG. 2, switching operation is performed by a switching control signal delivered in correspondence with the reproducing mode from the reproducing mode switching circuit MXC. Then, the single detection window pulse generating circuit DWCv constructed so that detection window pulses having predetermined pulse widths can be generated in accordance with respective reproducing modes produces a detection window pulse Pwv in correspondence with a designated reproducing mode. The detection window pulse Pwv thus produced is delivered to the phase comparison circuit PC of the phase locked loop PLL as a comparison wave.

In a manner stated above, in the bit clock signal generators for use in digital signal demodulator according to the present invention shown in FIGS. 1 and 2, respectively, even in the case where bit rates of respective signals to be demodulated are different, for example, as in the case that a signal to be demodulated is a reproduced signal produced in an ordinary reproducing mode from the rotary head type magnetic recording/reproducing equipment, a regenerative signal reproduced in a fast feeding mode therefrom, and a reproduced signal produced in a rewinding mode therefrom, since a scheme is employed to change the pulse width of the detection window pulse Pw in correspondence with changes in the bit rate of the signal to be demodulated so as to obtain a comparison wave of the pulse width necessary for allowing the phase comparison circuit PC in the phase locked loop PLL for producing a bit clock signal to effect a suitable comparing operation, the phase locked loop PLL in enabled to produce a bit clock signal always in a stabilized manner with its lock-in time being short.

The arrangement of the detection window pulse generating circuit used in the above-mentioned bit clock signal generator for digital signal demodulator shown in FIG. 2 will be explained with reference to FIG. 4. The detection window pulse generating circuit DWCv shown in FIG. 4 is composed of an exclusive logical sum circuit EXOR and a delay circuit in the same manner as in the detection window pulse generating circuit DWC shown in FIG. 3. In the detection window pulse generating circuit DWC shown in FIG. 3, the delay circuit having a fixed delay time is used for the delay circuit DL therefor. In this respect, the detection window pulse generating circuit DWCv shown in FIG. 4 differs from that shown in FIG. 3 in that a delay circuit having a variable time is used for its delay circuit.

The circuit shown in FIG. 4 includes transistor Q1 to Q42, resistors R1 to R14, a load resistor Rl, a capacitor C, reference voltage sources E1 and E2, diodes D1 and D2, constant current circuits ISI, IS2 and 23 to 30, and terminals 13 to 22. The portion indicated within the dotted frame labeled EXOR denotes the exclusive logical sum circuit.

The input terminal 20 in the detection window pulse generating circuit DWCv shown in Fig.4 corresponds to the input terminal 1 of the detection window pulse generating circuit DWCv used in the bit clock signal generator for digital signal demodulator according to the present invention shown in FIG. 2 which has been previously described.

An ETM (eight-to-ten modulation) signal as a signal to be demodulated of a digital signal having been modulated in accordance with a modulation system, such as a system constituted with a periodical signal intermittently including phase information of a bit clock signal (a signal such that an ETM signal as a signal to be demodulated is subjected to waveform shaping and the time points of rise and fall of the waveform in the signal to be demodulated are well-defined) S1 is delivered to the above-mentioned terminal 20 in FIG. 4. An example of the signal S1 is shown in FIG. 5(a).

In FIG. 5, the waveform of FIG. 5(b) represents a signal $\overline{S1}$ obtained by inverting the polarity of the above-mentioned signal S1, the waveform of FIG. 5(d) represents a signal $\overline{S1d}$ obtained by delaying the above-mentioned signal S1, the waveform of FIG. 5(e) represents a signal S1d obtained by inverting the polarity of the above-mentioned signal S1d, and the waveform of FIG. 5(f) represents a detection window pulse Pwv.

FIG. 5(c) shows an example of a change in a voltage delivered to the base of the transistor Q30 by charging and discharging operation carried out in the charging-/discharging capacitor C connected to the terminal 17 in the circuit comprising transistors Q28 and Q29 constituting a differential operational pair and the constant current circuits ISI and IS2, when the abovementioned signal S1 is delivered to the terminal 20. In this figure, H and L represent high and low levels, respectively.

In the above-mentioned circuit arrangement shown in FIG. 4, since the circuit comprising the transistors Q1 to Q5 and the constant current circuit 23 constitutes an amplifier having an unity gain, when the voltage source E1 having a voltage value E1 is connected to the base of the transistor Q1, this voltage E1 appears also on the emitter of the transistor Q5.

When a load resistor Rl having an excellent temperature characteristic is connected to the terminal 16 which is connected to the emitter of the abovementioned transistor Q5, a constant current flows, irrespective of the temperature change, in a circuit including the power source Vcc, the resistor R1, the emitter of the transistor Q7, the collector thereof, the collector of the transistor Q5, the emitter thereof, the terminal 16, the load resistor Rl and ground.

The transistors Q6 to Q10 and the resistors R1 to R4 constitute a current mirror circuit. Currents determined by the resistors R1 to R4 connected to the emitters of the respective transistors Q7 to Q10 flow in the collector circuits of the transistors Q8 to Q10.

The emitters of the transistors Q11 and Q12 are connected to the collector of the above-mentioned transistor Q8. Moreover, the emitters of the transistors Q13 and Q14 are connected to the collector of the above-mentioned transistor Q9. Furthermore, the emitters of the transistors Q15 and Q16 are connected to the above-mentioned transistors Q10.

The collectors of the above-mentioned transistors Q11, Q13 and Q15 are grounded. The collectors of the above-mentioned transistors Q7, Q14 and Q16 are commonly connected and their junction is connected to the base of the transistor Q17 and to the collector of the transistor Q18.

The collector of the above-mentioned transistor Q17 is connected to the power supply Vcc and the emitter thereof is connected to the base of the transistor Q18. The emitter of the transistor Q18 is grounded through the resistor R5. The bases of the above-mentioned transistors Q12, Q14 and Q16 are commonly connected and their junction is grounded through the reference voltage source E2.

To the terminal 15 connected to the base of the above-mentioned transistor Q11, in the condition where the rotary head type magnetic recording/reproducing equipment is in a reproducing mode for rewinding, a switching control signal of high level is delivered from the reproducing mode switching circuit MXC. Further, to the terminal 14 connected to the base of the above-mentioned transistor Q13, in the condition where the rotary head type magnetic recording/reproducing equipment is in a reproducing mode for fast-feeding, a switching control signal of high level is delivered from the reproducing mode switching circuit MXC. Furthermore, to the terminal 13 connected to the base of the abovementioned transistor Q15, in the condition where the rotary head type magnetic recording/reproducing equipment is in an ordinary reproducing mode, a switching control signal of high level in delivered from the reproducing mode switching circuit MXC.

Where no switching control signal of high level is delivered to the above-mentioned terminals 13 to 15, the transistors Q11, Q13 and Q15 all become conductive, with the result that the transistors Q12, Q14 and Q16 are all cut off. To the contrary, where a switching control signal of high level is delivered from the reproducing mode switching circuit MXC to any one of the above-mentioned terminals 13 to 15, the transistor of which base is connected to the terminal to which the switching control signal of high level is delivered is cut off. The transistor of which emitter is connected to the emitter of the transistor having been cut off becomes conductive. Thus, a current having a particular current value flows in a circuit including the collector of the transistor Q18, the emitter thereof, the resistor R5, and ground.

Accordingly, where a switching control singal of high level is selectively delivered from the reproducing mode switching circuit MXC to the terminal 13 in correspondence with the case that the operational mode of the rotary head type magnetic recording/reproducing equipment is in an ordinary reproducing mode, the transistor Q15 is cut off. As a result, the transistor Q16 of which emitter is connected to the emitter of the transistor Q15 having been cut off becomes conductive. Thus, a current having a particular current value indicating that the operational mode of the rotary head type magnetic recording/reproducing equipment is an ordinary reproducing mode flows in a circuit including the collector of the transistor Q18, the emitter thereof, the resistor R5, and ground. Where a switching control signal of high level is selectively delivered from the reproducing mode switching circuit MXC to the terminal 14 in correspondence with the case that the operational mode of the rotary head type magnetic recording/reproducing equipment is a reproducing mode for fast-feeding, the transistor Q13 is cut off. As a result, the transistor Q14 of which emitter is connected to the emitter of the transistor having been cut off becomes conductive. Thus, a current having a particular current value indicating that the operational mode of the rotary head type magnetic recording/reproducing equipment is a reproducing mode for fast-feeding flows in a circuit including the collector of the transistor Q18, the emitter thereof, the resistor R5, and ground. Furthermore, where a switching control signal of high level is selectively delivered from the reproducing mode switching circuit MXC to the terminal 15 in correspondence with the case that the operational mode of the rotary head type magnetic recording/reproducing equipment is a reproducing mode for rewinding, the transistor Q11 is cut off. As a result, the transistor Q12 of which emitter is connected to the emitter of the transistor Q11 having been cut off becomes conductive. Thus, a current having a particular current value indicating that the operational mode of the rotary head type magnetic recording/reproducing equipment is a reproducing mode for rewinding flows in a circuit including the collector of the transistor Q18, the emitter thereof, the resistor R5, and ground.

The current which has flowed in the above-mentioned transistor Q18 is delivered to a current mirror circuit composed of transistors Q17 to Q21 and resistors R5 to R8, and a current flowing in the above-mentioned transistor Q19 is delivered to a current mirror circuit composed of transistors Q24 to Q27 and resistors R9 to R11 via an electronic volume control constituted with input terminals 18 and 19 and transistors Q22 and Q23. The electronic volume control mentioned above is used for varying a voltage applied to the terminals 18 and 19 to adjust the value of a current caused to flow into the transistor Q24.

The circuit comprising transistors Q20 and Q21 and resistors R7 and R8 constitutes a constant current circuit IS2. This constant current circuit IS2 is connected to the common emitters of the transistors Q28 and Q29 constituting the differential operational pair. Moreover, the circuit comprising transistors Q26 and Q27 and resistors R10 and R11 constitutes a constant current circuit ISI for current I. This constant current circuit IS1 is connected to the collector circuit of the transistor Q29 in the transistors Q28 and Q29 constituting the differential operational pair.

When a signal S1 (see FIG. 5($a$)) is delivered from the terminal 20 to the base of the transistor Q28 in the above-mentioned transistors Q28 and Q29 constituting the differential operational pair and changes from low level to high level at time t1, the transistor Q28 becomes conductive at t1 and the transistor Q29 is cut off at the same time.

Thus, a constant current I is delivered from the constant current circuit IS1 to the charging/discharging capacitor C connected to the collector and base of the above-mentioned transistor Q29 and to the base of the above-mentioned transistor Q30, whereby the charging-/discharging capacitor C is charged.

The voltage across the terminal of the abovementioned charging/discharging capacitor C is delivered to the base of the transistor Q30 in the differential amplifier composed of transistor Q30 to Q33, resistors R12 and R13, constant current circuits 24 to 26, and reference voltage source Vs.

Thus, at time t2 when the voltage across the terminal of the charging/discharging capacitor C reaches the voltage value Vs of the reference voltage source Vs connected to the base of the transistor Q33, the transistor 31 to which the voltage across the terminal of the charging/discharging capacitor C is delivered via the transistor Q30 becomes conductive and the transistor Q32 becomes non-conductive.

Thus, the signal $\overline{S1d}$ outputted via the diode D1 of which anode is connected to the emitter of the transistor Q34 shifts to low level at time t2, and the signal S1d outputted via the diode D2 of which anode is connected to the emitter of the transistor Q35 shifts to high level at time t2 (see FIG. 5).

When the signal S1 delivered to the terminal 20 connected to the base of the above-mentioned transistor Q28 shifts from high level to low level at time t3, the transistor Q28 is cut off at this time t3 and at the same time the transistor Q29 becomes conductive.

Because the transistor Q29 has been conductive as just described above, the charge accumulated in the charging/discharging capacitor C connected to the collector of the transisotr Q29 and the base thereof and to the base of the transistor Q30 is discharged as a constant current $(2I-I)=I$ via the constant current circuit IS2.

Since the voltage across the terminal of the above-mentioned charging/discharging capacitor C is delivered to the base of the transistor Q30 in the differential amplifier constituted with transistors Q30 to Q33, resistors R12 and R13, constant current circuits 24 to 26, and reference voltage source Vs as previously described, at time t4 when the voltage across the terminal of the charging/discharging capacitor C gradually lowers, so that the voltage applied to the base of the transistor Q30, i.e., the voltage across the capacitor C of the charging/discharging capacitor C is below the voltage value Vs of the reference voltage source Vs connected to the base of the transistor Q33, the transistor Q31 to which the voltage across the terminal of the charging-/discharging capacitor C is delivered via the transistor Q30 becomes non-conductive and the transistor Q32 becomes conductive.

Thus, the signal $\overline{S1d}$ output via the diode D1 of which anode is connected to the transistor Q34 shfts to high level at time t4, and the signal S1d output via the diode D2 of which anode is connected to the emitter of the transistor Q35 shifts to low level at time t4 (see FIG. 5).

Since the above-mentioned operation is repeatedly conducted in the same manner also at times subsequent to t5, the signal S1d which is delayed by $\tau$ with respect to the signal S1 delivered to the terminal 20 connected to the base of the transistor Q28 appears on the cathode side of the diode D2. This signal is delivered to the exclusive logical sum circuit EXOR constituted with transistors Q36 to Q42, resistor R14, and constant current circuits 29 and 30. Moreover, the signal S1d having a polarity opposite so that of the above-mentioned signal S1d appears on the cathode side of the diode D1. This signal is delivered to the exclusive logical sum circuit EXOR constituted with transistors Q36 to Q42, resistor R14, and constant current circuits 29 and 30.

The signal S1 is delivered to the base of the transistor Q41 in the above-mentioned exclusive logical sum circuit constituted with transistors Q36 to Q42, resistor R14, and constant current circuits 29 and 30 via the terminal 22. Further, the signal $\overline{S1}$ is delivered to the base of the transistor Q40 in the above-mentioned logical sum circuit EXOR via the terminal 21. Thus, the exclusive logical sum circuit EXOR outputs a detection window pulse Pwv as shown in FIG. 5(f), which is an output indicative of logical sum of the above-mentioned signals S1 and $\overline{S1}$.

As just described above, the detection window pulse Pwv output from the exclusive logical sum circuit EXOR is obtained as a logical sum of the signal $\overline{S1}$ shown in FIG. 5(a) and the signal S1D, shown in FIG. 5(d), obtained by time-delaying the signal S1. The pulse width of the detection window pulse Pwv is determined by the delay time $\tau$ of between the signal S1 and S1d.

When the gradient on the time axis of the signal S2 shown in FIG. 5(c) is steep, the delay time $\tau$ of the signal S1 which determines the pulse width of the abovementioned detection window pulse Pwv becomes short, while when the gradient is gentle, the delay time $\tau$ becomes long.

The above-mentioned signal S2 is generated by the operation that the charging/discharging capacitor C is charged by a constant current I from the constant current circuit IS1 and the operation that the charging/discharging capacitor C is discharged by a constant current I which is the difference current between the currents fed from the constant current circuits IS1 and IS2. When the current value I set at the constant current circuits IS1 and IS2 is large, the gradient on the time axis of the signal S2 shown in FIG. 5(c) becomes steep, while when the current value I is small, the gradient becomes gentle.

Thus, as in the circuit arrangement shown in FIG. 4, an implementation is employed such that the constant current values I for charging and discharging the charging/discharging capacitor C are changed to required current values by a switching control signal of high level delivered from the reproducing mode switching circuit MXC to the terminals 13 to 15 in dependence upon the reproducing mode, respectively, whereby even when bit rates of a signal to be demodulated are different, the pulse width of the detection window pulse can be varied in correspondence with changes in the bit rate of the signal to be demodulated so as to obtain a comparison wave having a pulse width necessary for allowing the phase comparison circuit in the phase locked loop for generating a bit clock signal to effect a suitable phase comparing operation.

As is clear from the above detailed description, a bit clock signal generator for use in a digital signal demodulator according to the present invention comprising means for generating a detection window pulse having a predetermined pulse width shorter than a period of a bit clock signal from either of time points of rise and fall of the waveform of a signal to be demodulated, or from both the time points thereof, the signal to be demodulated being a digital signal demodulated in accordance with a modulation system such as a system constituted with a periodical signal intermittently including a phase information of the bit clock signal to deliver the detection window pulse to a phase locked loop including a phase comparison circuit and a voltage controlled oscillator as a signal wave to be compared with, thus allowing the voltage controlled oscillator in the phase locked loop to produce a bit clock signal, characterized by the provision of means for changing the pulse width of the detection window pulse in accordance with changes in a bit rate of the signal to be demodulated. In the bit clock signal generator for use in a digital signal demodulator according to the present invention, even in the case where bit rates of respective signals to be demodulated are different, for example, as in the case that a signal to be demodulated is a reproduced signal reproduced in an ordinary reproducing mode from the rotary head type magnetic recording/reproducing equipment, a reproduced signal reproduced in a fast-forward mode therefrom, and a reproduced signal reproduced in a rewinding mode therefrom, a scheme is employed to change the pulse width of the detection window pulse Pw in correspondence with changes in the bit rate of the signal to be demodulated so as to obtain a comparison wave of the pulse width necessary for allowing the phase comparison circuit PC in the phase locked loop PLL for generating a bit clock signal to effect a suitable comparing operation. Accordingly, the bit clock signal generator for use in a digital signal demodulator according to the present invention can satisfactorily solve all the problems encountered with the prior art equipment previously described.

What is claimed is:

1. A bit clock signal generator for use in a digital signal demodulator comprising:
   means for generating a detection window pulse having a predetermined pulse width shorter than a period of a bit clock signal from either of time points of rise and fall of the wveform of a signal to be demodulated, or from both the time points thereof, said signal to be demodulated being a digital signal modulated in accordance with a modulation system such as a system constituted with a periodical signal intermittently including a phase information of the bit clock signal;

a phase locked loop including a phase comparison circuit and a voltage controlled oscillator, said phase locked loop responding to said detection window pulse delivered thereto as a signal wave to be compared with to generate a bit clock signal; and means for changing the pulse width of said detection window pulse in correspondence with changes in a bit rate of said signal to be demodulated.

2. A bit clock signal generator for use in a digital signal demodulator as set forth in claim 1, wherein said detection window pulse generating means is composed of an exclusive logical sum circuit, and a delay circuit for delaying either of two inputs of said exclusive logical sum circuit.

3. A bit clock signal generator for use in a digital signal demodulator as set forth in claim 2, wherein said delay circuit is a delay circuit having a variable delay time.

4. A bit clock signal generator for use in a digital signal demodulator as set forth in claim 1, wherein said detection window pulse generating means includes a plurality of circuits which form pulses having different pulse widths from each other, respectively, said detection window pulse generating means being adapted to select one of said plurality of circuits.

5. A bit clock signal generator for use in a digital signal demodulator as set forth in claim 4, wherein said plurality of circuits are adapted to form pulses having pulse widths which are in conformity with an ordinary reproducing mode, a rewinding mode, and a fast-feeding mode, respectively.

* * * * *